United States Patent Office 2,947,338
Patented Aug. 2, 1960

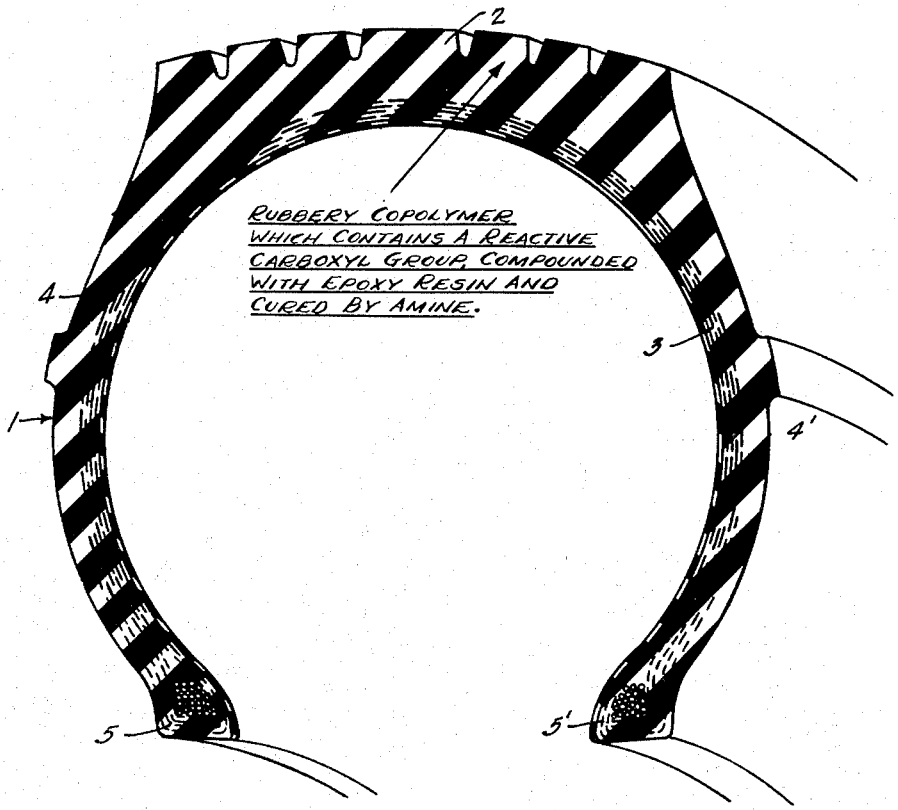

2,947,338

EPOXIDE CURE OF RUBBERY COPOLYMER WHICH CONTAINS A REACTIVE CARBOXYL GROUP

Robert J. Reid, Canal Fulton, and Byron H. Werner, Akron, Ohio, assignors to The Firestone Tire & Rubber Company, Akron, Ohio, a corporation of Ohio Filed Apr. 19, 1957, Ser. No. 653,847

17 Claims. (Cl. 152—330)

This invention relates to improvements in the curing of a rubbery copolymer which includes a reactive carboxyl group. The curing agent is a polyepoxide in which the epoxy oxygen group is united to two carbon atoms which are adjacent to one another, and in the preferred procedures of this invention catalysts are employed to accelerate the cure. With a catalyst, the amount of the polyepoxide employed may be in excess of that required to cure the rubbery copolymer, in which case this excess acts as a reinforcing agent. The invention includes the method of curing, the cured product, and more particularly, a tire embodying the cured product.

The accompanying drawing is a section through a tire made with a rubber of this invention, such as is discussed more particularly in what follows.

The rubbery copolymers to which this invention relates are elastomers; that is, on curing they are converted from plastic materials to thermoset products having tensile strengths and elongations, etc., which resemble rubber to a greater or less degree. They contain from 0.03 to 0.4 chemical equivalent by weight of free or anhydride carboxyl groups (all calculated as —COOH) per 100 parts by weight of copolymer.

A usual way of obtaining these rubbery copolymers is by copolymerization of two or more monomers which include at least one conjugated diene and one olefinically unsaturated carboxylic acid or carboxylic acid anhydride. The uncured copolymer contains one or more reactive carboxyl groups, part or all of which on curing may be neutralized to metal carboxylate groups or amides.

The conjugated dienes which may be used include, for instance, butadiene, isoprene, methylpentadiene, 2-chlorobutadiene, 2,3-dimethyl-butadiene, 2-cyanobutadiene, the straight-chain and branched-chain pentadienes and hexadienes, other straight-chain and branched-chain hydrocarbon dienes and halogen substituted derivatives thereof, piperylene, etc. The rubbery copolymer is composed, at least 50 percent by weight, of one or more conjugated dienes.

The olefinically unsaturated carboxylic acid monomers which may be used include, for example, acrylic acid, methacrylic acid, crotonic acid, cinnamic acid, maleic acid, fumaric acid, itaconic acid, beta-acryloxy propionic acid, the vinyl acrylic acids, sorbic acid, oleic acid, undecylenic acid, ricinoleic acid, linoleic acid, alpha-butyl crotonic acid, hydrosorbic acid, beta-benzal acrylic acid, alpha-methyl sorbic acid, alpha-vinyl cinnamic acid, glutaconic acid, muconic acid, the mono- and dialkyl sorbic acids, chloro acrylic acid, chloromethacrylic acid, etc.

The olefinically unsaturated carboxylic acid anhydrides which may be used include maleic anhydride, itaconic anhydride, and generally the anhydrides of the foregoing acids.

The one or more other monomers which may be used in the copolymerization include all of the monomers copolymerizable in this type of reaction, as is well known in the art. The following are listed as representative: acrylonitrile, chloroacrylonitrile, methacrylonitrile, alkyl esters of acrylic and methacrylic acids, vinylidene chloride, styrene, substituted styrenes, isobutylene, vinyl chloride, vinylidene fluoride, trifluoroethylene, maleic anhydride, perfluoropropene, methyl vinyl ketone, methyl isopropyl ketone, vinyl pyrrolidine, etc.

If the rubbery copolymer is produced by copolymerization, it will usually be obtained by emulsion copolymerization with a water-soluble free-radical-generating catalyst, as, for example, potassium persulfate, other peroxygen compounds, etc.

It is known in the art that these rubbery copolymers may be produced by other methods than simple emulsion polymerization, including, for example, graft copolymerization of a carboxylic acid or carboxylic acid anhydride onto a polymeric substrate; by condensation; by hydrolysis of polymers containing ester or amide groups; etc.

The examples refer more particularly to the curing of butadiene-methacrylic acid (85:15) copolymer, referred to herein as copolymer No. 1, although the invention is applicable to other rubbery copolymers, as, for example, copolymers obtained by emulsion polymerization of the following groups of monomers in the proportions which yield rubbery products: ethyl acrylate and methacrylic acid; butyl acrylate and acrylic acid; butadiene and acrylic acid; ethyl acrylate and maleic anhydride; dihydroperfluorobutylacrylate with acrylic acid; etc. Substantial amounts of a third monomer may be used, as in the following terpolymers: butadiene, styrene and methacrylic acid; butadiene, methyl methacrylate and methacrylic acid; butadiene, acrylonitrile and methacrylic acid; etc.

The polyepoxides which are used as curing agents consist of compounds containing two or more epoxide groups. They can be either monomeric or polymeric in nature. They include, for example, butadiene-diepoxide; reaction products of epichlorohydrin with polyhydric phenols or glycols, e.g. ethylene glycol, glycerol, pentaerythritol, butanediol, trimethylol-propane, resorcinol, bis-phenol A (the condensation product of acetone and phenol), phloroglucinol, catechol, hydroquinone; glycidyl

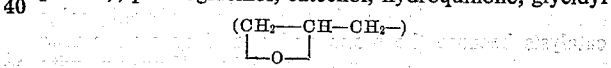

esters of polybasic acids, such as glycidyl phthalate; epoxidized poly-unsaturated hydrocarbons and oils; etc. These polyepoxides are well known in the art. Both resinous and non-resinous polyepoxides may be used. In the examples, reference will be had more particularly to Epon 828 and Epon 1001, resinous products manufactured by Shell Chemical Company, known to be condensation products of epichlorhydrin and p,p'-isopropylidenediphenol (bisphenol A). The properties of these and other epoxide resins derived from epichlorhydrin and isopropylidenephenol which may be used in carrying out the invention, are given in the following table:

| Resin | Epoxide Equivalent [1] | Melting Point,[2] °C. | Viscosity,[3] 25° C. | |
|---|---|---|---|---|
| | | | (Gardner-Holdt) | Poises |
| Epon 562 | 140–165 | | C–F | 0.9–1.5 |
| Epon 828 | 175–210 | | $Z_5$–$Z_6$ | 100–160 |
| Epon 834 | 225–290 | | O–V | 3.5–9.0 |
| Epon 864 | 300–375 | 40–45 | $A_1$–B | 0.3–0.6 |
| Epon 1001 | 425–550 | 65–75 | D–G | 1.0–1.6 |

[1] Grams of resin containing one gram-equivalent of epoxide.
[2] Durran mercury method.
[3] Epon 562 and 828 on pure resin; Epon 834 on 70% wt. solution in butyl carbitol; Epon 864 and 1001 on 40% wt. solution in butyl carbitol at 25° C.

In curing the rubbery copolymers with the polyepoxide, inorganic bases, salts and amines can be used as catalysts, but are not necessary. Such cures may be effected in combination with sulfur. The cross link formed in curing the rubbery copolymers with the polyepoxides appears to be an ester produced by the reaction of the polyepoxide on a carboxyl group of the copolymer.

In curing the rubbery copolymers without a catalyst, a larger amount of polyepoxide is required than when a catalyst is present. For example, without a catalyst optimum cures are obtained with greater than 15 parts of polyepoxide per 100 parts of a rubbery copolymer as, for example, 20 to 30 and even 50 parts and more. Up to 80 parts of polyepoxide have been employed without any substantial improvement over the use of, for example, 30 parts. In the presence of a catalyst a much smaller amount as, for example, only a few percent as, for instance, not over 5 percent has given satisfactory results. The time and temperature required for optimum cure depend upon the nature and amount of catalyst employed, as well as the nature of the rubbery copolymer, as, for example, the percentage of the carboxyl groups present therein. Temperatures between 250 and 350° F. are commonly employed. Optimum cures are obtained generally in 20 to 90 minutes.

Typical reinforcing agents can be compounded with the rubbery copolymer and polyepoxide such as silicas, carbon blacks, etc. It has been observed that the Epon resins themselves act as reinforcing agents as well as curing agents, as will be more fully explained in what follows.

The invention relates particularly to the use of two different types of catalysts in connection with the curing of these rubbery copolymers with a polyepoxide, viz. (1) metallic salts, oxides, and hydroxides and (2) amines, both of which are known to the art as so-called catalysts. The metallic oxides and hydroxides include, for example, the oxides and/or hydroxides of zinc, cadmium, sodium, calcium, barium, magnesium, lead, silver, potassium, lithium, mercury, titanium, aluminum, strontium, copper (cupric), cobalt (cobaltic), tin oxide (SnO), etc.

The metallic salts in general are salts of weak acids and any of the foregoing metals, including, for example, calcium stearate, zinc stearate, calcium silicate, sodium acetate, zinc-2-ethyl-hexoate, etc.

When small amounts of the polyepoxides are used in the cure, the tertiary amines are the preferred amine catalysts because the mono and secondary amines tend to cure the polyepoxides too rapidly. However, with larger amounts of the polyepoxides mono and secondary amines may be employed. Amines generally may be utilized where they are free of groups which produce side reactions, and more particularly such amines as dicyandiamide, mono, secondary and tertiary alkylamines (e.g., the methyl, ethyl, butyl, etc., amines up to and including the long-chain alkylamines), aromatic amines (e.g., pyridine, aniline, substituted anilines, and the naphthylamines), morpholine, polyalkylene-polyamines (e.g., diethylenetriamine, triethylene tetramine, dipropylene triamine, etc.), etc.

Mixtures of copolymer and polyepoxide are cured by heating to 270–330° F., although higher temperatures may be used.

PREPARATION OF COPOLYMER NO. 1

The following were introduced into a stirred, heated autoclave after removal of air:

| | Parts by weight |
|---|---|
| Butadiene | 85 |
| Methacrylic acid | 15 |
| Aquarex G [1] | 1.6 |
| Potassium persulfate | 0.3 |
| Water | 200 |

[1] Aquarex G is the sodium salt of a sulfonated paraffin hyrocarbon, manufactured by Du Pont.

The polymerization was carried on at 50° C. to a conversion of 70 percent at which stage 0.2 part of hydroquinone was added to stop the reaction, and the rubbery polymer after washing on a corrugated mill was dried in an oven at 50° C. The proportions of the monomers can be varied to produce copolymers containing 0.03 to 0.4 chemical equivalents by weight of carboxyl groups, viz. within the range of 70 to 98 percent of butadiene to 30 to 2 percent of methacrylic acid.

Other conjugated dienes and olefinically unsaturated carboxylic acids or carboxylic acid anhydrides can be similarly copolymerized, in varying proportions, with or without a third monomer.

The following examples are illustrative of the production of the rubbery copolymer of the invention:

*Example 1*

A masterbatch stock was prepared according to the following formula:

| | Parts by weight |
|---|---|
| Copolymer No. 1 | 100 |
| PBNA | 2 |
| HAF Black | 35 |
| Plasticizing oil | 6 |

In the foregoing and other formulae disclosed herein, PBNA means phenyl-beta-naphthylamine. The plasticizing oil or softening agent employed was a hydrocarbon oil which contained no low-boiling ingredients. Other softening agents could be employed in its stead.

The foregoing masterbatch was divided into six portions, and Epon resin 1001 and dicyandiamide were added to the several portions as set forth in the following table where the figures refer to parts by weight per 100 parts of copolymer No. 1 which were added to the masterbatch. The various portions were cured for 30 minutes at 329° F., and the physical properties of each of the cured portions were determined and they are recorded in the following table:

| Sample No. | 1 | 2 | 3 | 4 | 5 | 6 |
|---|---|---|---|---|---|---|
| Parts Added: | | | | | | |
| Dicyandiamide | 0 | 0 | 0 | 3 | 3 | 3 |
| Epon 1001 | 5 | 10 | 20 | 5 | 10 | 20 |
| Physical Properties: | | | | | | |
| Tensile strength (p.s.i.) | 625 | 1,450 | 2,325 | 2,565 | 2,625 | 2,675 |
| Percent Elongation | 1,120 | 747 | 480 | 539 | 530 | 333 |
| Shore A Hardness | 39 | 50 | 67 | 69 | 65 | 75 |

The Epon resin 1001 alone, under the conditions of cure indicated, gave insufficient curing at the smaller amounts of 5 to 10 parts. Twenty parts gave a good cure. With dicyandiamide as a catalyst, good cures were obtained even with 5 and 10 parts of the Epon resin, and the Epon resin in excess of that used in curing served as a reinforcing agent.

*Example 7, 8, 9 and 10*

The following table gives the different amounts of various compounding ingredients per 100 parts of copolymer No. 1 used in four curing formulae. The stocks were cured for the times and temperatures indicated in the table; and after curing the different stocks had the physical properties recorded here.

| Example | 7 | 8 | 9 | 10 |
|---|---|---|---|---|
| Formulae: | | | | |
| Copolymer No. 1 | 100 | 100 | 100 | 100 |
| Epon 1001 | 20 | 20 | | 20 |
| Dicyandiamide | 2 | 2 | | 0 |
| Zinc oxide | | 4.8 | 4 | 0 |
| Sulfur | | 1.9 | 1.6 | 0 |
| Mercaptobenzothiazole | | 1.1 | 1.0 | 0 |
| Stearic acid | | 1.0 | 0.8 | 0 |
| Diethylenetriamine | | | | 4 |
| Curing Conditions: | | | | |
| Time (minutes) | 30 | 20 | 20 | 30 |
| Temperature, °F | 330 | 312 | 312 | 330 |
| Physical Properties: | | | | |
| Tensile strength (p.s.i.) | 750 | 3,142 | 225 | 1,025 |
| Percent Elongation | 255 | 300 | 490 | 640 |
| Shore A Hardness | 51 | 80 | 50 | 40 |

The results show that the polyepoxide gave a much better cure than sulfur under the conditions set forth, and that the stock containing both the epoxy resin and the sulfur gave excellent properties.

The terrific enhancement of properties in the combination in Example 8 was due to the curing and reinforcing action of the epoxy resin. The term "reinforcing" is employed (as is common in the rubber art) to refer to an enhancement of the physical properties of a rubber due to the pigmentation thereof.

Examples 7 and 10 show that a good cure can be obtained with different amine catalysts.

Examples 11, 12, 13 and 14

A number of compounds were prepared using n-methylmorpholine as the catalyst, and their compositions, and properties are set forth in the following table. All samples were cured 60 minutes at 300° F.

| Example | 11 | 12 | 13 | 14 |
|---|---|---|---|---|
| Formulae: | | | | |
| Copolymer No. 1 | 100 | 100 | 100 | 100 |
| Stearic acid | 2 | 2 | 2 | 2 |
| HAF Black | 40 | 40 | 40 | 30 |
| Zinc oxide | 2 | 5 | 8 | 0 |
| Epon 828 | 5 | 5 | 5 | 5 |
| N-methylmorpholine | 0.05 | 0.05 | 0.05 | 1 |
| PBNA | 2 | 2 | 2 | 2 |
| Physical Properties (at 73° F.): | | | | |
| Tensile strength (p.s.i.) | 3,200 | 4,500 | 4,800 | 2,950 |
| Percent Elongation | 460 | 320 | 280 | 510 |

The above normal physical properties (obtained at 73° F.) illustrate that small amounts of epoxy resin (Epon 828) in conjunction with a basic tertiary amine catalyst give excellent cures of the rubbery polymer. The use of zinc oxide in conjunction with the epoxy resin greatly enhances the tensile strength of these materials.

Example 15

A terpolymer was prepared from butadiene, acrylonitrile, and methacrylic acid in the proportions 55:40:5, following generally the instructions for the preparation of copolymer No. 1. This was compounded according to the following formula:

| | Parts |
|---|---|
| Terpolymer | 100 |
| HAF Black | 40 |
| Epon 828 | 8 |
| PBNA | 2 |
| N-methylmorpholine | 1.6 |

The above stock was cured for 20 minutes at 340° F. Samples of the cured stock were aged for 8 hours at different temperatures in air, and identical samples were aged for 8 hours at different temperatures in nitrogen, with the following results:

| | Unaged | Aged in Air | Aged in Nitrogen |
|---|---|---|---|
| Temperature of Aging, ° F | | 300 / 400 | 400 / 450 |
| Tensile strength (p.s.i.) | 4,050 | 2,400 / 500 | 2,650 / 2,525 |
| Percent Elongation | 390 | 230 / 60 | 180 / 150 |

These results indicate that although in the presence of air the terpolymer deteriorated rapidly at 400° F., in the absence of air, good properties are retained by these cured stocks over prolonged periods, even at 450° F.

In each of the foregoing examples either Epon resin 828 or Epon resin 1001 or other diepoxide or polyepoxide may be used. The examples are illustrative.

USE IN TIRES

The heat generated in tires of natural rubber and tires of synthetic rubber hastens the decomposition of the rubber. This heat is generated by the constant flexing of the rubber when in use, whether in a sidewall or in a tread, or elsewhere. Generally, different rubber compositions are used in the tread and in a sidewall of a tire. The compositions of Examples 8, and 11–14 would all make satisfactory rubbers for both the sidewall and tread of a tire. Their resistance to abrasion and resistance to deterioration when heated make the rubbers of these examples particularly well suited for use in tire treads. A tire in which the rubber of this invention is the only rubber used, would be utilized just as rubbers are now utilized in the manufacture of tires, except for the compounding which is illustrated herein. Such a tire is illustrated in the accompanying drawing, which is a fragmentary, perspective sectional view of a pneumatic tire 1, comprising a tread 2, a body portion 3, sidewalls 4, 4' and beads 5, 5'. If the composition of any of these examples is used for the tread only, the rubber used elsewhere would have to be one which bonded to this rubber on curing.

The polyepoxides can be used alone or together with other curing agents as illustrated above. A minimum of 3 percent by weight of the polyepoxide per 100 parts of rubbery copolymer is required.

The invention is covered by the claims which follow.

What we claim is:

1. The method of curing an elastomer which contains from 0.03 to 0.4 chemical equivalent by weight of free and anhydride carboxyl groups (all calculated as —COOH) per 100 parts by weight of elastomer, in which the elastomer is a copolymer of a conjugated diene and an olefinically unsaturated monomer from the class consisting of carboxylic acids and carboxylic acid anhydrides, which method comprises heating the elastomer admixed with a polyepoxide in which the epoxy oxygen group is united to two carbon atoms which are adjacent to one another, the temperature and time of heating being equivalent to 90 to 20 minutes at 250 to 350° F.

2. Elastomeric copolymer of a conjugated diene and an olefinically unsaturated monomer from the class consisting of carboxylic acids and carboxylic acid anhydrides which contains from 0.03 to 0.4 chemical equivalent by weight of carboxylic groups (calculated as —COOH), cured by the method of claim 1.

3. The method of claim 1 in which the polyepoxide is condensation product of epichlorhydrin and p,p'-isopropylidenediphenol.

4. Elastomeric copolymer of a conjugated diene and an olefinically unsaturated monomer from the class consisting of carboxylic acids and carboxylic acid anhydrides which contains from 0.03 to 0.4 chemical equivalent by weight of carboxylic groups (calculated as —COOH), cured by the method of claim 1 using a polyepoxide condensation product of epichlorhydrin and p,p'-isopropylidenediphenol.

5. The method of claim 1 in which at least 15 parts of polyepoxide per 100 parts of the elastomer is used without a catalyst.

6. The method of claim 1 carried out in the presence of a catalyst from the class consisting of amines, metal oxides, metal salts, and metal hydroxides.

7. The method of claim 1 carried out in the presence of an amine as a catalyst.

8. The method of claim 1 carried out in the presence of a metal oxide as a catalyst.

9. The method of curing an elastomer which contains from 0.03 to 0.4 chemical equivalent by weight of free and anhydride carboxyl groups (all calculated as —COOH per 100 parts by weight of the elastomer) in which the elastomer is copolymer of butadiene and an olefinically unsaturated monomer from the class consisting of carboxylic acids and carboxylic acid anhydrides, which method comprises heating the elastomer with a polyepoxide and a catalyst from the group consisting of amines, metal salts and metal oxides and metal hydroxides, using polyepoxide in excess of that required to cure the elastomer, said excess serving as a reinforcing agent, the polyepoxide being one in which the epoxy oxygen group is united to two carbon atoms which are adjacent to one another, the temperature and time of heating being equivalent to 90 to 20 minutes at 250 to 350° F.

10. Elastomeric copolymer of a conjugated diene and an olefinically unsaturated monomer from the class consisting of carboxylic acids and carboxylic acid anhydrides which contains from 0.03 to 0.4 chemical equivalent by weight of carboxylic groups (calculated as —COOH), cured by the method of claim 9 whereby it is reinforced by said polyepoxide.

11. The process of claim 9 in which the catalyst is a tertiary amine.

12. Elastomeric copolymer of a conjugated diene and an olefinically unsaturated monomer from the class consisting of carboxylic acids and carboxylic acid anhydrides which contains from 0.03 to 0.4 chemical equivalent by weight of carboxylic groups (calculated as —COOH), cured by the method of claim 9 using a tertiary amine as a catalyst, whereby the cured elastomer is reinforced by said polyepoxide.

13. A pneumatic tire comprising a tread, a body portion, sidewalls and beads, the tread being composed essentially of a copolymer as defined in claim 2.

14. The process of claim 9 in which the polyepoxide is a polyepoxide condensation product of epichlorhydrin and p,p'-isopropylidenediphenol.

15. Elastomeric copolymer of a conjugated diene and an olefinically unsaturated monomer from the class consisting of carboxylic acids and carboxylic acid anhydrides which contains from 0.03 to 0.4 chemical equivalent by weight of carboxylic groups (calculated as —COOH), cured by the method of claim 9 using as the polyepoxide a polyepoxide condensation product of epichlorhydrin and p,p'-isopropylidenediphenol, the cured elastomer also being reinforced with said polyepoxide.

16. The process of claim 9 in which both a tertiary amine and zinc oxide are used as catalysts.

17. The process of claim 9 in which both a tertiary amine and zinc oxide are used as catalysts, and the polyepoxide used is condensation product of epichlorhydrin and p,p'-isopropylidenediphenol.

References Cited in the file of this patent

UNITED STATES PATENTS 2,604,464     Segall et al.             July 22, 1952

FOREIGN PATENTS 736,457     Great Britain            June 14, 1952